Jan. 19, 1932.                    B. C. PLACE                    1,842,284
                                FASTENER SOCKET
                              Filed Sept. 27, 1928
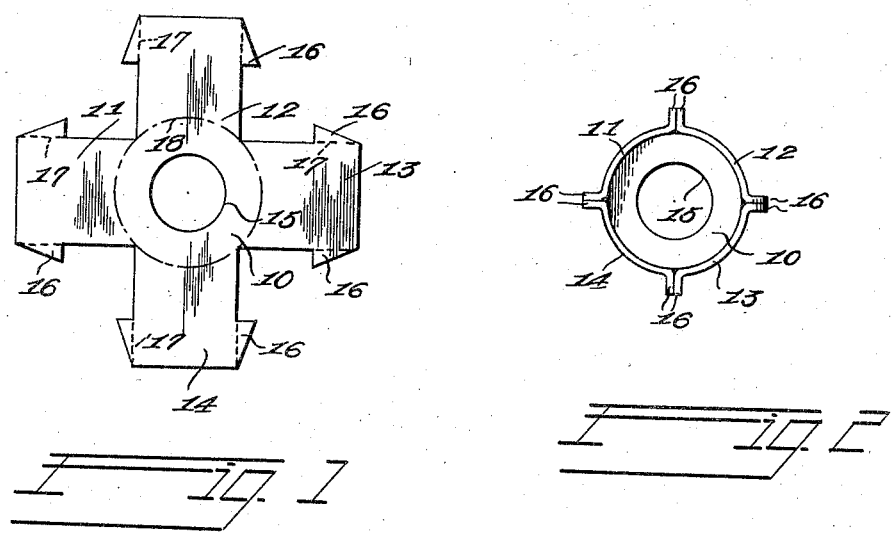
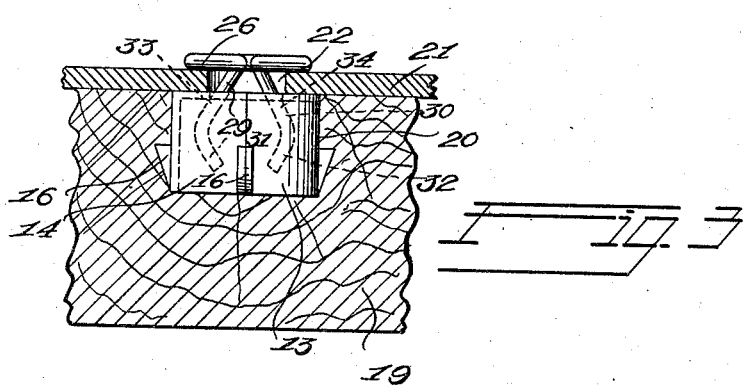
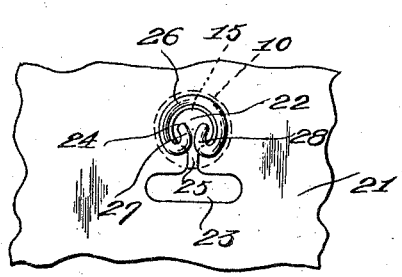
Inventor
Bion C. Place
By James R. Hoffman
                    Attorney Patented Jan. 19, 1932

1,842,284

UNITED STATES PATENT OFFICE

BION C. PLACE, OF DETROIT, MICHIGAN, ASSIGNOR OF ONE-HALF TO GEORGE E. GAGNIER, OF DETROIT, MICHIGAN

FASTENER SOCKET

Application filed September 27, 1928. Serial No. 308,780.

This invention relates to a socket designed to receive the holding portions of a spring fastener, which socket may be readily applied to a wooden or composition foundation structure or supporting element. The invention is intended particularly for use in connection with the securing of trim panels to the structural or frame elements of automobile bodies, though obviously, the invention is capable of being put to many other similar uses.

The primary object of the invention is to provide a socket for a spring fastener that may be manufactured at an extremely low cost and that may be assembled with relation to the structural member or similar element that supports it in an extremely simple and expeditious manner.

A further object of the invention is to provide a socket for a spring fastener that is formed of sheet metal bent to approximately the form of an opening provided in the structural member to receive it, and that may be driven into said opening and held therein by engagement of portions of the sheet metal with the walls of said opening.

A still further object of the invention is to provide a socket for a spring fastener, constructed of sheet metal, formed to provide teeth disposed so that they will bite into the wooden or composition structural member or similar element when the socket is driven into an opening formed to receive it.

Still further objects of the invention will appear as a description thereof proceeds with reference to the accompanying drawings, in which:

Fig. 1 is a plan view of a sheet metal blank from which the socket is constructed.

Fig. 2 is a bottom view of the socket after the blank shown in Fig. 1 has been bent to form the socket.

Fig. 3 is a sectional view showing the application of the socket to a foundation structure or similar supporting element and showing a spring fastener in engagement with the socket and holding a panel, such as a trim panel, against said structure or element.

Fig. 4 is a plan view of the assembly shown in Fig. 3.

Like reference characters indicate like parts throughout the several figures.

Preferably the socket member is stamped out of sheet metal of such outline that a portion of the sheet metal blank may form the body or top of the socket and other portions may form the sides thereof when the sheet metal blank is bent to form the socket.

In the drawings, Fig. 1 shows a preferred form of such a blank, including a central body or top portion 10 having a plurality of wings 11, 12, 13 and 14 radiating from said central portion. The central portion is perforated as shown at 15 for a purpose presently to be described. Each of the radially extending wings is provided with a pair of oppositely extending projections 16, preferably triangular, of a toothed shape similar to that of the point of a fish hook, as shown in the drawings. These projections are intended to bite into the wood or composition forming the supporting element for the applied panel in the automobile or similar structure. Obviously, projections of various forms other than that just described will serve this purpose and such projections may be used in place of the projections 16 if desired.

The projections 16 are bent at a suitable angle to the bodies of the radially projecting wings on the dotted lines indicated by 17 in Fig. 1. The wings are then bent roughly on the broken line 18, Fig. 1, in the same direction, so that the sides of adjacent wings are approximately brought into abutting relation. When the wings are bent to this position the projections 16 on adjacent wings abut against each other, as clearly shown in Fig. 2. It is not essential that the blank be bent into an accurate cylindrical form, since, as hereinafter pointed out, it is not necessary that the socket member accurately fit the opening in the structural element to which it is applied.

The socket just described is applied to a suitable structural element of wood or composition such as indicated by the numeral 19, Fig. 3. Before applying the socket to this element it is provided with a hole 20 bored, or otherwise formed, to a depth approximating the length of the wings 11, 12, 13 and 14. In order to assemble the socket with respect to the element 19, said socket is simply driven into the opening 20 until the outer surface of the body portion 10 thereof is flush with the outer surface of said element, as clearly shown in Fig. 3. In view of the fact that the socket is constructed of sheet metal it will readily adapt itself to the opening in the stuctural element, the socket being readily deformed to adapt it to the opening. Accordingly, accuracy in the form of the socket is not required. Preferably, the opening is made small enough to provide a snug fit for the socket member, whereby the teeth 16 will effectively bite into the material of the structural element and firmly hold the socket member in assembled relation with respect thereto.

As above pointed out, the invention is particularly designed for use in securing the trim panels for the interior of automobile bodies in position with respect to the structural elements of the automobile. In the application of this invention the structural elements of the automobile or similar structure are provided with a plurality of sockets, as just described, arranged in spaced relation in accordance with the spacing of the fastener receiving openings in the panels that are to be applied thereto. A fragment of such a panel is shown in Figs. 3 and 4 of the drawings and indicated by the numeral 21. The fastener receiving opening in said panel is indicated by the numeral 22. Preferably, the opening 22 is of the form shown in Fig. 4, that is, it includes a wide slot 23, a circular portion 24 opening at one side by means of a narrow slot 25 into said portion 23. The opening is made in this form in order that the head of the fastener may be entered in the portion 23 and so that the shank thereof may be moved sidewise through the narrow portion 25 and then rotated through an angle of approximately 90° to bring the wider dimension of the shank of the fastener across the circular portion of said opening 24. It should be understood however, that circular openings may be substituted for those shown in the drawings, if it is not desired or necessary to assemble the fastener with respect to the panel as just described. The special form of opening, just referred to, is provided to permit the application of the fastener, about to be described, to the panel from the rear face thereof before the panel is applied to the structural element. Such application from the rear face thereof is desirable because trim panels are frequently provided with an outer imperforate covering providing a pleasing appearance and it is desirable to apply the fastener to the panel without perforating said outer covering. If no outer covering is used an opening of any form may be provided.

Preferably, the headed spring fastener is of the type disclosed in my Patent #1,679,266, granted July 31st, 1928, though any headed fastener of the type that is adapted to be entered into a socket and to frictionally engage portions of the socket may be used. The fastener illustrated in the drawings is preferably constructed of a single piece of resilient wire bent between its ends into circular form to provide a head 26. The ends of the wire are bent inward in the plane of said head into the space defined by said head, as shown at 27 and 28 on Fig. 4. The ends are then bent at right angles to the plane of said head to form diverging holding portions 29 and 30, Fig. 3. The tips of the ends are then bent toward each other to form converging guiding portions 31 and 32.

In the application of the fasteners just described to the sockets the fastener is assembled with respect to the panel 21 from the rear face thereof or in any other suitable manner. The panel with the fastener assembled with respect thereto, is then applied to the structural element by inserting the converging guiding portions 31 and 32 in the opening 15 in the body 10 of the socket above described. Pressure is exerted on the head of the fastener and the guiding portions cause the diverging holding portions 29 and 30 to approach each other to permit the entry of these portions in said openings. As the movement of the panel including the fastener toward the socket is continued, the diverging holding portions 29 and 30 spring apart and firmly engage the relatively sharp corners 33 and 34 of the metal forming said openings. The diverging holding portions 29 and 30 firmly engage said corners in biting line contact therewith, thus providing a firm engagement between said portions and the socket that will hold the panel firmly in assembled relation to the structural element 19, and at the same time permit of its ready removal when such removal is necessary.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A sheet metal socket for a fastener provided with a centrally disposed flat body portion having a fastener receiving perforation in said portion and a plurality of socket holding portions projecting away from said flat body portion in planes substantially normal thereto and designed to be driven into a supporting element, said holding portions being provided with projections of a shape similar to that of the point of a fish hook to retain said socket in assembled relation with respect to said supporting element when it is driven into said element.

2. A socket for a spring fastener constructed of a sheet metal blank having a body portion provided with a fastener receiving perforation and a plurality of wings extending radially from said body portion, said wings being bent approximately at right angles to said body portion and being formed with laterally projecting teeth shaped to present shoulders to prevent withdrawal of said socket so that when the socket is driven into a supporting element said socket will be held in assembled relation with respect to said element by said teeth.

3. A socket for a spring fastener constructed of a sheet metal blank having a body portion provided with a fastener receiving perforation and a plurality of wings extending radially from said body and each provided with a plurality of projections, said wings being bent approximately at right angles to said body portion and said projections being bent approximately at right angles to said wings to form teeth, said socket being designed to be driven into an opening formed in a supporting element and to be held in assembled relation thereto by the teeth on said wings.

4. A blank for a socket designed to receive a spring fastener comprising a perforated sheet metal body having wings extending radially therefrom, each of said wings being provided with a plurality of lateral projections arranged to be bent approximately at right angles to said wings to form teeth presenting abrupt shoulders disposed approximately at right angles to the length of the wing to hold the socket in assembled relation to a supporting element.

BION C. PLACE.